United States Patent
Hunt

(10) Patent No.: US 11,763,569 B2
(45) Date of Patent: Sep. 19, 2023

(54) SYSTEM FOR CONTROLLING A CAMERA SUPPORTING HUMAN REVIEW OF SENSOR INFORMATION

(71) Applicants: Denso International America Inc., Southfield, MI (US); DENSO CORPORATION, Kariya (JP)

(72) Inventor: Shawn Hunt, Bethel Park, PA (US)

(73) Assignees: DENSO International America, Inc., Southfield, MI (US); DENSO Corporation, Aichi (JP)

( * ) Notice: Subject to any disclaimer, the term of this patent is extended or adjusted under 35 U.S.C. 154(b) by 176 days.

(21) Appl. No.: 17/500,059

(22) Filed: Oct. 13, 2021

(65) Prior Publication Data

US 2022/0311932 A1    Sep. 29, 2022

Related U.S. Application Data

(60) Provisional application No. 63/165,240, filed on Mar. 24, 2021.

(51) Int. Cl.
| | |
|---|---|
| *G06V 20/56* | (2022.01) |
| *G06F 18/25* | (2023.01) |
| *G06F 18/21* | (2023.01) |
| *H04N 23/61* | (2023.01) |

(52) U.S. Cl.
CPC .......... *G06V 20/56* (2022.01); *G06F 18/2178* (2023.01); *G06F 18/2193* (2023.01); *G06F 18/253* (2023.01); *H04N 23/61* (2023.01)

(58) Field of Classification Search
CPC .... H04N 23/61; G06V 20/56; G06F 18/2178; G06F 18/253; G06F 18/2193
USPC ........................................................ 348/148
See application file for complete search history.

(56) References Cited

U.S. PATENT DOCUMENTS

| | | | |
|---|---|---|---|
| 9,959,467 B2 | 5/2018 | Folkens et al. | |
| 2011/0251768 A1* | 10/2011 | Luo | G06V 20/58 |
| | | | 701/1 |
| 2014/0263143 A1 | 12/2014 | Dharssi et al. | |
| 2014/0363143 A1 | 12/2014 | Dharssi et al. | |
| 2021/0027486 A1* | 1/2021 | Kaino | G06T 7/73 |
| 2021/0156698 A1 | 5/2021 | Koda et al. | |
| 2022/0215639 A1* | 7/2022 | Hu | G06T 19/006 |

FOREIGN PATENT DOCUMENTS

CN        109800805 A       5/2019

* cited by examiner

*Primary Examiner* — Allen C Wong
(74) *Attorney, Agent, or Firm* — Christopher G. Darrow; Darrow Mustafa PC

(57) ABSTRACT

A camera control system is provided for controlling operation of a camera mounted on a vehicle. The system includes a processor and a memory communicably coupled to the processor. The memory stores a camera control module configured to compare a recognition confidence level associated with a feature to a predetermined threshold and, responsive to the recognition confidence level being below the predetermined threshold and using location information associated with the feature, control operation of the camera to capture at least one image of the feature during movement of the vehicle.

20 Claims, 3 Drawing Sheets

SYSTEM FOR CONTROLLING A CAMERA SUPPORTING HUMAN REVIEW OF SENSOR INFORMATION

CROSS REFERENCE TO RELATED APPLICATIONS

This application claims benefit of U.S. Provisional Application No. 63/165,240, filed on Mar. 24, 2021, which is herein incorporated by reference in its entirety.

TECHNICAL FIELD

The subject matter described herein relates to interpretation of vehicle sensor data to recognize a detected object and, more particularly, to human review of sensor data to correlate the data with a recognized object for purposes of updating vehicle sensor system object recognition capabilities.

BACKGROUND

The subject matter described herein relates to interpretation of vehicle sensor data to recognize a detected object and, more particularly, to human review of sensor data to correlate the data with a recognized object for purposes of updating a vehicle's sensor system object recognition capabilities.

Vehicles commonly incorporate lidar and radar sensors to detect features in an environment of a vehicle. The vehicle may also incorporate sensor data processing routines and hardware configured to interpret the sensor data to attempt to recognize and/or categorize detected features, for example, by comparison with stored information describing known and previously encountered features. However, some detected features may not be recognizable by the sensor data processing routines, for example because the feature has never before been encountered, because of the condition of the detected feature, or because an angle at which the feature is "viewed" by the sensor makes it difficult to accurately compare the processed data to a known features. Software also exists for generating 2-dimensional and 3-dimensional representations of sensor data (such as point clouds) for human review. However, due to limitations of such software, the exact identity of a detected object may be unclear even to a human reviewer reviewing the generated representation of the feature.

SUMMARY

In one aspect of the embodiments described herein, a camera control system is provided for controlling operation of a camera mounted on a vehicle. The system includes a processor and a memory communicably coupled to the processor. The memory stores a camera control module including computer-readable instructions that when executed by the processor cause the processor to compare a recognition confidence level associated with a feature to a predetermined threshold and, responsive to the recognition confidence level being below the predetermined threshold and using location information associated with the feature, control operation of the camera to capture at least one image of the feature during movement of the vehicle.

In another aspect of the embodiments described herein, a method is provided for controlling operation of a camera mounted on a vehicle. The method includes steps of comparing a recognition confidence level associated with a feature to a predetermined threshold and, responsive to the recognition confidence level being below the predetermined threshold and using location information associated with the feature, controlling operation of the camera to capture at least one image of the feature during movement of the vehicle.

In yet another aspect of the embodiments described herein, a non-transitory computer readable medium is provided for controlling operation of a camera mounted on a vehicle. The medium has stored therein instructions that, when executed by a computing system, cause the computing system to perform functions comprising comparing a recognition confidence level associated with a feature to a predetermined threshold and, responsive to the recognition confidence level being below the predetermined threshold and using location information associated with the feature, controlling operation of the camera to capture at least one image of the feature during movement of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a camera control system for controlling operation of a camera mounted on a vehicle. The system includes a processor and a memory communicably coupled to the processor. The memory stores a camera control module configured to compare a recognition confidence level associated with a feature to a predetermined threshold. Responsive to the recognition confidence level being below the predetermined threshold and using location information associated with the feature, control operation of the camera to capture at least one image of the feature during movement of the vehicle. The captured image may be time-correlated with lidar and/or radar data relating to the detected feature and acquired at the same time as the camera image. If the confidence level is below the predetermined threshold, the time-correlated camera images and processed lidar/radar information may be forwarded to a human reviewer. The human reviewer may compare and relate the lidar/radar information to camera images of the actual feature represented in the lidar/radar information. When the lidar/radar information is categorized or associated with an actual known feature, the newly-acquired lidar/radar information relating to the feature may be added to a catalog of known lidar/radar information associated with the feature, thereby expanding the resource database used for comparison with newly-acquired lidar/radar information. This may facilitate future recognition of that feature or a similar feature in other vehicles using the same database as a source of known lidar/radar information for comparison.

Figure 1:
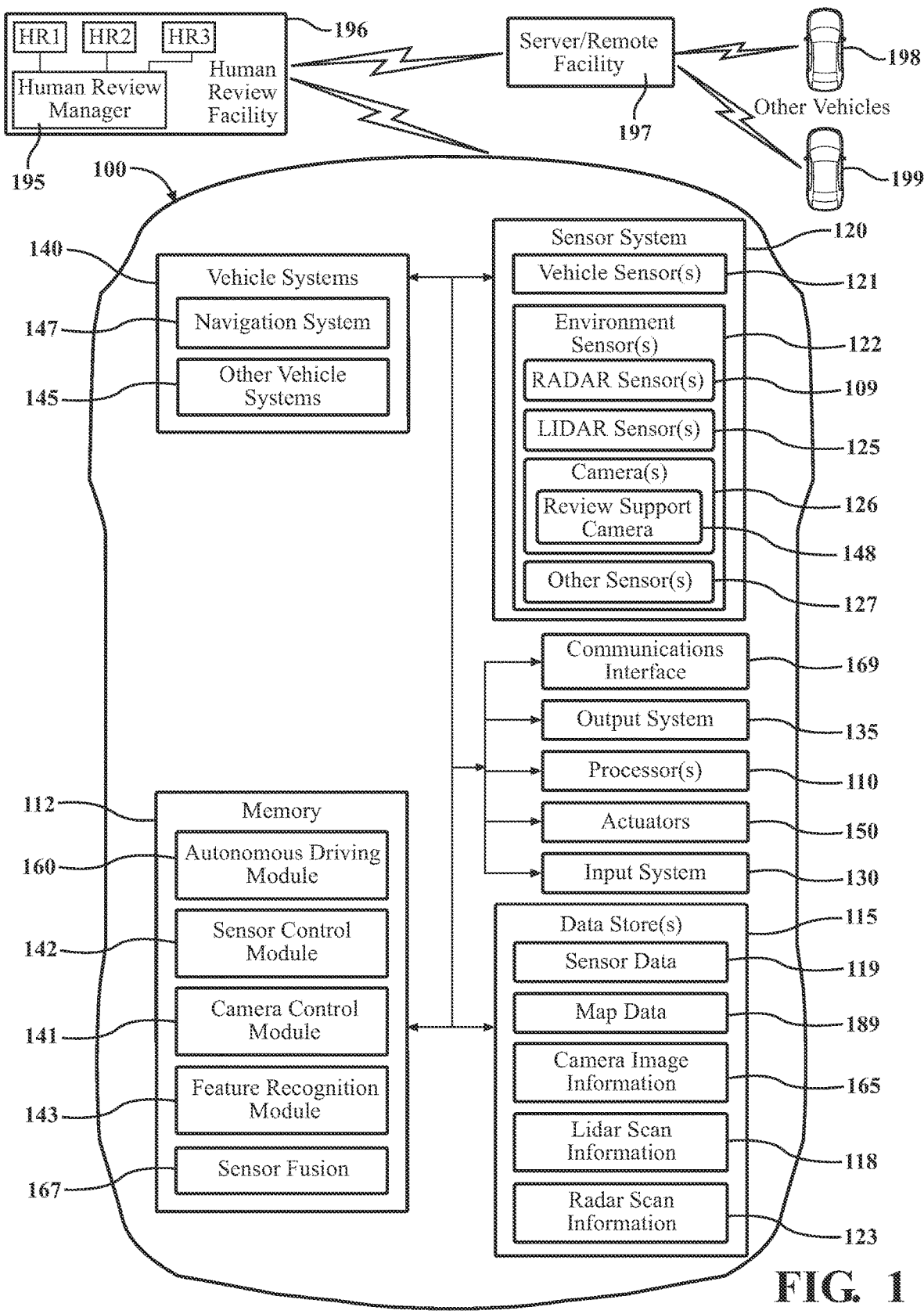
FIG. 1 is a block schematic diagram of a vehicle incorporating a camera control system in accordance with embodiments described herein.

FIG. 1 shows a block schematic diagram of a vehicle 100 incorporating a camera control system, in accordance with embodiments described herein. The camera control system may be configured for controlling operation of a review support camera 148 mounted on the vehicle 100. As used herein, a "vehicle" is any form of motorized transport. In one or more implementations, the vehicle 100 is a conventional passenger vehicle, such as a sedan, pickup truck, or SUV, although the vehicle 100 may be any form of motorized transport which includes a lidar sensor and/or a radar sensor as part of the vehicle sensors.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

Embodiments of the camera control module 141 described herein may autonomously control operation of the review support camera 148 for the purposes described herein both when the vehicle is being operated in a manual mode or in an autonomous mode. The camera control module 141 may interface with the autonomous driving module 160 as needed to facilitate autonomous control of the camera 148.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include operational information and specifications on radar sensor(s) 109, lidar sensor(s) 125, and camera(s) 126 of the sensor system 120. The data store(s) 115 may be operably connected to the vehicle wireless communications interface 169 for transmission of information to a cloud or other extra-vehicular entity.

In one or more arrangements, the one or more data stores 115 can include map data 189. The map data 189 can include maps of one or more geographic areas. In some instances, the map data 189 can include information or data on roads, traffic control devices, road markings, structures, features of interest, and/or landmarks in the one or more geographic areas. The map data 189 can be in any suitable form. In some instances, the map data 189 can include aerial views of an area. In some instances, the map data 189 can include ground views of an area, including 360-degree ground views. The map data 189 can include measurements, dimensions, distances, and/or information for one or more items included in the map data 189 and/or relative to other items included in the map data 189. The map data 189 can include a digital map with information about road geometry, road grades and slopes, and other road information, including information about the road on which the vehicle 100 is currently traveling. The map data 189 can be high quality and/or highly detailed. In one or more arrangements, the map data 189 may be updated continuously (i.e., as soon as information relating to revisions becomes available) or regularly from a cloud source or other source exterior of the vehicle. Information from map data 189 may be used to determine location information relating to features of the environment detected by lidar and radar scans.

Camera image information 165 may include images (such as digital images) of features of the environment captured by a camera (such as review support camera 148) and/or generated from data acquired by the camera. Camera image information 165 may include camera image data from which camera images viewable by a human reviewer may be generated. The camera control module 141 may include computer-readable instructions that when executed by the processor cause the processor to time-correlate camera image information 165 with contemporaneously-acquired lidar scan information and/or radar scan information (e.g., camera image data may be linked in time to lidar data and/or radar data acquired at the same time as the lidar and/or radar data). Thus, for example, a camera image captured by the review support camera 148 at 2:05 p.m. during a vehicle day trip may be time-correlated with a lidar scan performed by a lidar sensor 125 at 2:05 p.m. during the day trip.

Lidar scan information 118 may include scan data acquired by a lidar sensor 125 during a lidar scan, location information describing locations of features detected by lidar scans, computer-generated identifications and/or classifications of the features, confidence levels relating to the feature identifications, information describing point clouds generated from associated lidar scans, dates and times of day at which the associated lidar scans were performed, information describing known or identified point cloud configurations for purposes comparison with newly acquired scan data and associated point clouds, and other information relating to lidar scans performed by a lidar sensor 125. As stated above, the lidar scan information may be time-correlated with contemporaneously-acquired camera image information and/or radar scan information (i.e., lidar data may be linked in time to camera image and/or radar data acquired at the same time as the camera image and/or radar data). Using the data acquired from lidar and/or radar scans, the processor(s) 110 may generate point clouds representative of features detected in the vehicle environment.

Radar scan information 123 may include scan data acquired by a radar sensor 109 during a radar scan, location information describing locations of features detected by radar scans, computer-generated identifications and/or classifications of the features, confidence levels relating to the feature identifications, information describing point clouds generated from associated radar scans, dates and times of day at which associated radar scans were performed, information describing known or identified point cloud configurations for purposes of comparison with newly acquired scan data and associated point clouds, and other information relating to radar scans performed by a radar sensor 109. As stated above, the radar scan information may be time-correlated with contemporaneously-acquired camera image information and/or radar scan information (i.e., radar data may be linked in time to camera image and/or radar data acquired at the same time as the camera image and/or radar data).

Using the data acquired from lidar and/or radar scans, the processor(s) 110 may, in a known manner, generate point clouds representative of features detected in the vehicle environment.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) of the vehicle 100 (including any of the elements shown in FIG. 1).

The sensor system 120 can include any suitable type of sensor. Various examples of different types of sensors will be described herein. However, it will be understood that the embodiments are not limited to the particular sensors described. Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to a cloud or other storage facility or for vehicle-to-vehicle (V2V) or vehicle-to-everything (V2X) communications. The sensors may also be operably connected to other vehicle systems and components, such as data stores 115 and processor(s) 110, to facilitate storage and processing of vehicle and environment sensor data. The existence of the various conditions described herein may be calculated or otherwise determined using sensor data.

Sensors of the sensor system 120 may include (or be operably connected to) one or more timers or clocks (not shown) configured to enable acquisition, tracking, storage, generation and/or processing of time-correlated sensor data and other information as described herein. This time-correlated information may be provided to a human reviewer to aid the reviewer in associating features detected by lidar and radar scans with physical features shown in associated camera images.

The sensor system 120 can include one or more vehicle sensors 121. The vehicle sensor(s) 121 can detect, determine, and/or sense information about the vehicle 100 itself and/or any occupants inside the vehicle. The vehicle sensor(s) 121 may include sensors configured to detect conditions and/or events inside the vehicle interior or occupant compartment. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed. The vehicle sensor(s) 121 may include sensors configured to sense aspects of the vehicle mechanical and electrical components and/or systems, to aid in determining a mechanical condition of the vehicle and existing and/or potential problems with the vehicle.

The sensor system 120 can include one or more environment sensors 122 configured to acquire data of at least a portion of the external environment of the vehicle 100 (e.g., nearby objects). The environment sensors 122 may detect data or information about the external environment in which the vehicle is located or one or more portions thereof. For example, the environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, other vehicles, etc. As an example, in one or more arrangements, the environment sensors 122 can include one or more radar sensors 109, one or more lidar sensors 125, one or more cameras 126 (including review support camera 148) and/or other types of sensors 127.

Environment sensors such as lidar sensor(s) 125 and radar sensor(s) 109 may be operable to attempt to detect and recognize features in the vehicle environment. Radar 109, lidar 125, camera(s) 126, and/or other sensors may also be usable to monitor the speed, acceleration, position, and other characteristics of features in the environment of vehicle 100, such as signage, foliage, other vehicles, pedestrians, etc. Environment sensors 122 may be configured to detect aspects of road geometry, road grade/slope, traffic conditions, movements and characteristics of other vehicles, and other external events and conditions.

In one or more arrangements, the environment sensors 122 may be configured to (either alone or in cooperation with navigation system 147 and sensor control module 142) determine or acquire location information relating to features of the vehicle environment detected by the sensors. This location information may be associated with sensor data to enable determination of the locations of scanned features with respect to the location of the vehicle 100 when the sensor data was acquired.

"Location information" may be information describing the location of a feature, a point cloud, or a lidar/radar data point generated from lidar data in detail sufficient to enable the camera control module 141 (described below) to direct and focus the review support camera 148 on the location or feature. The location information may be in the form of spatial coordinates or in any other form suitable for the purposes described herein. "Spatial coordinates" refer to a numerical or other designation representing a location of any feature of the vehicle environment (including a low recognition confidence level feature of the vehicle environment as described herein). A system of spatial coordinates may be used which provides a location of a low recognition confidence level feature on which the review support camera can attempt to focus the camera for purposes of image capture.

In the case of a low recognition confidence level feature that is static with respect to the Earth's surface, the spatial coordinates may represent a location with respect to a reference frame (e.g., on the Earth's surface) which may be considered fixed with respect to the moving vehicle. In the case of a low recognition confidence level feature which moves relative to the Earth's surface, the spatial coordinates may represent a current location of the moving object relative to the vehicle itself. The spatial coordinates may be Cartesian, polar, geographic and/or any other type or types of coordinates suitable for specifying a location of the feature of the vehicle environment. The spatial coordinates may be assigned to a detected feature by the processor(s) 110 operating in conjunction with the vehicle navigation system 147 and/or using map data 189 after a location of the feature in terms of the pertinent coordinate system has been determined.

A review support camera 148 may be a camera configured to capture images of features of the environment or to photograph features of the environment. "Capturing an image" of a feature may include acquiring data from which a digital image may be constructed. "Photographing" by the review support camera may include taking a photograph by use of a camera (such as a digital camera) or acquiring data from which a photograph (such as a digital photograph) may be constructed.

In one or more arrangements, review support camera 148 may be a specialized camera dedicated solely to photographing or capturing images of low confidence-level features as described herein, for purposes of supporting human review of information relating to the low confidence-level features. Alternatively, another camera of the environment sensors may be retasked to perform review support functions as needed and as described herein. In this case, the dedicated review support camera may be omitted and control of the other camera may be transferred from the sensor control module 142 to the camera control module 141 for purposes of capturing images usable to support human review of the lidar/radar scan information.

The review support camera 148 may include various elements configured to be controllable by the camera control module 141 (described in greater detail below). The review support camera 148 may include a camera, any camera mountings, motor(s), gears, mechanisms and/or other elements (not shown separately) needed to enable the orientation, field of view and/or focus of the camera 148 to be adjusted for the purposes described herein. The camera 148 may also include other elements as required (not shown).

The field of view of the camera 148 may be a volume of space (in relation to a current position of the camera) toward which the camera lens may be pointed and focused to enable capture of an image of a feature residing within the volume of space. Then, when the camera 148 is controlled so as to include a feature in the camera field of view, an image captured by the camera will include an image of the feature. The camera 148 may also be directed and focused so that its field of view includes a set of spatial coordinates containing a feature, so that a captured image the coordinates will also show the feature.

Referring again to FIG. 1, a sensor fusion algorithm 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the environment of vehicle 100, evaluations of particular situations, and/or evaluations of possible impacts based on the particular situation. Other assessments are possible. Thus, in one or more arrangements for example, the sensor fusion may be used in attempting to identify a feature from a recently-scanned point cloud.

The vehicle wireless communications interface 169 may be configured to enable and/or facilitate communication between the components and systems of the vehicle and entities (such as cloud facilities, cellular and other mobile communications devices, other vehicles, remote servers, pedestrians, etc.) exterior of the vehicle. Wireless communications interface 169 may be configured to facilitate, establish, maintain, and end wireless V2V and V2X communications with any extra-vehicular entity, for example other connectibly-configured vehicles and connected vehicles, pedestrians, servers and entities located in the cloud, edge servers, and other information sources and entities. Information such as sensor data, camera image information, lidar and radar scan information, and other types of information may be transmitted and received via the communications interface 169. Wireless communications interface 169 may incorporate or be in communication with any network interfaces needed to communicate with any extra-vehicular entities and/or networks.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. The vehicle 100 can also include an output system 135. An "output system" includes any device, component, or arrangement or groups thereof that enable information/data to be presented to a vehicle occupant (e.g., a driver, a vehicle passenger, etc.) or a remote user.

The vehicle 100 can include one or more vehicle systems, collectively designated 140. The vehicle systems 140 can include a navigation system 147. The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with the autonomous driving module 160 to guide the vehicle along a travel route selected by a user. The navigation system 147 may be configured to operate in conjunction with the camera control module 141 to determine and update location information relating to a low recognition confidence level feature, and to aid in guiding and maintaining direction and focus of the camera 148 toward a low recognition confidence level feature during movement of the vehicle 100.

The vehicle systems 140 can also include other systems (collectively labeled 145). For example, the vehicle systems 140 can include a propulsion system, a braking system, a steering system, throttle system, a suspension system, a transmission system (none of which are explicitly shown in FIG. 1). Each of these vehicle systems can include one or more devices, components, and/or a combination thereof, now known or later developed.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities.

In embodiments described herein, a memory 112 may store an autonomous driving module 160, a sensor control module 142, a feature recognition module 143, and a camera control module 141. The memory 112 may be a random-access memory (RAM), read-only memory (ROM), a hard-disk drive, a flash memory, or other suitable memory for storing the modules 160, 141, 142, and 143. The modules 160, 141, 142, and 143 are, for example, computer-readable instructions that when executed by the processor(s) 110, cause the processor(s) 110 to perform the various functions disclosed herein. Additional modules (not shown) may also be stored in memory 112.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the user vehicle so as to drive the vehicle along a travel route, from an initial or start location to a destination.

The processor(s) 110, the autonomous driving module 160, the camera control module 141, and/or other modules described herein can be operably connected to communicate with each other and with the other elements of the vehicle, including various vehicle systems 140 and/or individual components thereof. For example, referring to FIG. 1, the processor(s) 110 and the autonomous driving module(s) 160 can be in communication to send and/or receive information from the various vehicle systems 140 to control the movement, speed, maneuvering, heading, direction, etc. of the vehicle 100. The processor(s) 110, the autonomous driving module(s) 160, and/or other elements of the vehicle may control some or all of the vehicle systems 140 and, thus, may be partially or fully autonomous.

The processor(s) 110, the autonomous driving module(s) 160, and the navigation system 147 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include a sensor control module 142. The sensor control module 142 may include computer-readable instructions that when executed by the processor(s) 110 cause the processor(s) to control operation of the vehicle sensors 121 and/or the environment sensors 122. For example, the sensor control module 142 may be configured to control operations of one or more sensors to vary sensor scan rates, to vary scan or viewing angles, and to control other sensor operational parameters according to existing conditions and detection requirements. Alternatively, one or more of the vehicle sensors 121 and/or the environment sensors 122 may be configured for automatic or internal control by incorporating therein independent processors and/or memories, thereby obviating the need for a separate controller for the pertinent sensor(s).

In one or more particular arrangements, the sensor control module 142 may be configured to control operations of one or more of the environment sensors 122 except for the review support camera 148, operations of which may be controlled by the camera control module 141. In other particular arrangements, the control functions of the camera control module 141 as described herein may be incorporated into (and performed by) the sensor control module 142.

The vehicle 100 can include a feature recognition module 143. The feature recognition module 143 can include computer-readable instructions that when executed by the processor(s) 110 cause the processor(s) to process lidar and radar scan data and/or other information acquired from and/or generated from lidar and/or radar scans of the environment, to attempt to recognize or identify features of the vehicle environment represented by the data and/or other information.

The resulting feature identifications may subsequently be communicated to a human driver to aid in driver decision-making. The resulting feature identifications may also be used or further processed by other modules and/or other vehicle system for autonomous decision making.

The vehicle environment may include anything exterior of the vehicle interior spaces and separate from the vehicle 100. A feature of the vehicle environment may be a discrete object or a portion of a discrete object located in the vehicle environment. The feature may or may not be identified or recognized by processing of lidar and/or radar scan data by the feature recognition module 143. Upon receiving data from the lidar scan, the feature recognition module 143 (or another module) may, in cooperation with the processor(s) 110, process the lidar and/or radar data to generate one or more point clouds including representations of scanned features. The feature recognition module 143 may then, in cooperation with the processor(s) 110, execute feature recognition routines directed to identifying or recognizing the feature represented by the point clouds. The resulting feature identifications may subsequently be communicated to a human driver to aid in driver decision-making. The resulting feature identifications may also be used or further processed by other modules and/or other vehicle systems for autonomous decision making. For example, the feature recognition module 143 can be configured to compare point clouds generated from lidar and/or radar scan data with point clouds and/or other information representing known features that may be present in a vehicle environment. Information regarding the known features may be stored in a memory (such as lidar scan information 118, radar scan information 123, and/or another memory configured to be accessible to the feature recognition module 143).

The feature recognition module 143 can include computer-readable instructions that when executed by the processor(s) cause the processor(s) to cooperate with the environment sensors 122 and the navigation system 147 to determine location information relating to features of the environment identified by the feature recognition module. The feature locations may be determined using location information stored in lidar scan information 118 and/or radar scan information 123 and acquired during lidar and/or radar scans. Sensor scan rates may be sufficiently high so that a particular feature, once identified, can be reliably tracked and monitored for changes in its location, recognition confidence level, and other associated characteristics, and so that feature information stored in memory can be updated.

The feature recognition module 143 can include computer-readable instructions that when executed by the processor(s) 110 cause the processor(s) to calculate recognition confidence levels for feature identifications generated by the feature recognition module 143. The recognition confidence levels may be stored in memory in association with the feature identification.

Some of the features detected by the lidar scans may not be easily identifiable by the feature recognition module 143, because of the angle with respect to the vehicle 100 at which the feature was scanned, because the point cloud representing the feature is not sufficiently similar enough to point clouds stored in memory for comparison, because the scan is partially obstructed, and/or for other reasons. Thus, the feature identifications generated by the feature recognition module 143 may have varying degrees of certainty associated with them. Consequently, the feature recognition module 143 may be configured calculate a confidence level (CL) to be associated with the identification of each feature. The confidence level may be a measure of confidence or certainty that the identification of the feature by the feature recognition module 143 is correct. For example, a review of a point cloud generated from data acquired when a feature resides at an unusual viewing angle (due to high winds or damage to the feature being scanned) may result in a relatively lower calculated confidence level based on a computer-generated recognition of the feature than would review of the same feature under ideal sensor scanning conditions.

A "recognition confidence level" or "confidence level" is a numerical value or other indicator of a level of confidence in a computer-generated recognition of a feature of the vehicle environment. An indicator of the recognition confidence level may be a numerical indicator determined by a processor and designed for comparison with a numerical predetermined feature recognition confidence level threshold. The feature recognition module may be configured to assign a recognition confidence level (CL) to a computer-generated identification of a feature detected by a lidar or radar scan. A "low recognition confidence level" refers to a recognition confidence level that is below the predetermined threshold. A "low recognition confidence level feature" is a feature of the environment having a recognition confidence level below the predetermined threshold.

For the purposes described herein, the recognition confidence levels may be based on any of a number of criteria. For example, in one or more arrangements, the confidence levels may be computed based, at least in part, on a comparison between information derived from a series of successive lidar/radar scans taken during vehicle movement, and one or more reference point clouds, as a distance from the vehicle to the scanned feature decreases and/or as an angle at which a portion of the sensor scan wave contacts the feature changes during vehicle movement. This "scanning angle" may be associated with how the feature appears visually when viewed from the perspective of the moving vehicle. If the comparison shows that the scanned feature appears more and more similar to the feature represented by the reference point cloud as the vehicle moves, a relatively higher confidence level may be computed and assigned to the feature identification. Any of a variety of additional or alternative criteria may be employed in an algorithm configured calculate a confidence level to be associated with a feature identification.

The feature recognition module 143 can include computer-readable instructions that when executed by the processor(s) 110 cause the processor(s) to compare a confidence level of the feature identification with a predetermined threshold value. If the confidence level in a given feature identification is above the threshold, the feature identification determined by the feature recognition module may be used by the vehicle systems in the performance of further calculations and functions. However, if the confidence level in a given feature identification is at or below the threshold, images of the low-confidence level feature may be captured as described herein, for review by a human reviewer.

The feature recognition module 143 can include computer-readable instructions that when executed by the processor(s) 110 cause the processor(s) to store location information relating to identified features, associated confidence levels, information regarding the feature classifications (e.g., "foliage") and other information relating to the scans of detected environment features. For example, such information may be stored in a memory such as lidar scan information 118 (for information relating to lidar scans).

The feature recognition module 143 can include computer-readable instructions that when executed by the processor(s) 110 cause the processor(s) to update (in memory) feature information based the latest lidar/radar scans. Such updated feature information may include revised recognition confidence levels, updated feature location information, updated point cloud information representing the feature, and any other information relating to the feature. In one or more arrangements, such information may be updated in a memory (for example, in lidar scan information 118) where the information is being stored.

The vehicle 100 can include a camera control module 141. The camera control module 141 can include computer-readable instructions that when executed by the processor(s) 110 cause the processor(s) to compare a recognition confidence level associated with a feature to a predetermined threshold and, responsive to the recognition confidence level being below the predetermined threshold and using location information associated with the feature, control operation of the camera to capture at least one image of the feature during movement of the vehicle.

The camera control module 141 can include computer-readable instructions that when executed by the processor(s) 110 cause the processor(s) to control operation of the review support camera 148 to capture images of features of the vehicle environment simultaneously with operation of a lidar sensor 125. The camera control module can also include computer-readable instructions that when executed by the processor cause the processor to control operation of the vehicle camera to capture images of the feature simultaneously with operation of a radar sensor 109. These simultaneous operations of the review support camera 148 and the radar and lidar sensors enable the information acquired by these sensors to be time-correlated and associated.

The camera control module 141 can include computer-readable instructions that when executed by the processor(s) 110 cause the processor(s) to control all review support camera operations, including movement, pointing, focusing, and image capture responsive to vehicle movement direction and speed, location information relating to low recognition confidence level features of the environment to be imaged, and other pertinent information.

The camera control module 141 may include computer-readable instructions that when executed by the processor(s) 110 cause the processor(s) to time-correlate lidar data and/or radar data (i.e., data acquired by the lidar and radar sensors during scans) with at least one contemporaneous image of the feature captured by the camera 148 (i.e., an image captured at the same time that the lidar/radar scan data was acquired by the lidar scan and/or radar scan), and vice versa. This time correlation may be used to associate lidar and radar scans with contemporaneously captured images for human review. Thus, for example, a camera image captured by the review support camera 148 at 2:05 p.m. during a vehicle trip may be linked to a lidar scan performed by a lidar sensor 125 at 2:05 p.m. during the trip, to facilitate human review of the lidar data and associated camera images.

The camera control module 141 may include computer-readable instructions that when executed by the processor(s) 110 cause the processor(s) to time-correlate lidar data with at least one contemporaneous image of the feature captured by the vehicle camera.

The camera control module may also include computer-readable instructions that when executed by the processor(s) 110 cause the processor(s) to time-correlate radar data with at least one contemporaneous image of the feature captured by the camera.

The camera images may be time-correlated to contemporaneously-acquired lidar scan data and/or radar scan data (e.g., camera images may be linked in time to lidar and/or radar data acquired at the same time as the lidar and/or radar data).

The camera control module 141 can include computer-readable instructions that when executed by the processor(s) 110 cause the processor(s) to cooperate with the navigation system 147 to "track" or remain focused on a feature or on a geographical or spatial location during movement of the vehicle 100. The ability to operate the camera 148 so as to maintain focus on a feature or area may depend on the degree to which the camera 148 may be swiveled, displaced, elevated and depressed and/or the degree to which the lens may be pointed and the degree to which it can be refocused, etc. It is desirable to maintain the feature of the vehicle environment in the current field of view of the camera 148 while the vehicle 100 is moving, to enable high-frequency acquisition of images of features while the vehicle is moving.

In one or more arrangements, for purposes of accessing feature information needed to control operation of the review support camera 148, the camera control module 141 may include computer-readable instructions that when executed by the processor(s) 110 cause the processor(s) to access a memory (for example, lidar scan information 118 or radar scan information 123) where feature information is stored for the feature location information, confidence levels, and other information. Access to location information relating to a low confidence level feature may enable the camera control module 141 to control the camera 148 to capture images of the feature, by focusing the camera on the feature or on a location where the feature resides.

The camera control module 141 can include computer-readable instructions that when executed by the processor(s) 110 cause the processor(s) to, either periodically or in response to updates in lidar/radar scans information, access updated feature information relating to a feature previously determined to be a low confidence level feature, and which is currently selected for image capture by the camera 148. This may be done to determine if the confidence level related to the feature has changed between sensor scans.

The camera control module 141 may include computer-readable instructions that when executed by the processor(s) 110 cause the processor(s) to compare the current recognition confidence level (i.e., the confidence level determined using data from the latest sensor scan) associated with a feature to a predetermined threshold. This comparison may enable the camera control module 141 to determine if the confidence level has risen above the predetermined threshold based on interpretation of the latest radar/lidar scan data (for example, due to a change in scanning angle of a sensor caused by movement of the vehicle), by comparing the current recognition confidence level to the predetermined threshold. Based on this comparison, the camera control module 141 may control the camera 148 to either stop attempting to capture images of the feature (if the recognition confidence level is at or above the threshold), or to continue attempting to capture images of the feature (if the camera is currently attempting to capture images of the feature, the current recognition confidence level associated with the feature is low, and the most recent previously determined recognition confidence level was also low).

The camera control module 141 may include computer-readable instructions that when executed by the processor(s) 110 cause the processor(s) to, responsive to the recognition confidence level being below the predetermined threshold and using location information associated with the feature, control operation of the camera 148 to capture at least one image of the feature during movement of the vehicle 100. Thus, when the confidence level associated with a feature is first determined to be below the threshold, the camera control module 141 may control the review support camera 148 to start capturing images of the feature. In addition, as long as the confidence level associated with the feature continues to be below the threshold, the camera control module 141 may control the review support camera 148 to continue to attempt to capture images of the feature.

The camera control module 141 may include computer-readable instructions that when executed by the processor(s) 110 cause the processor(s) to, responsive to the recognition confidence level being at or above the predetermined threshold, control operation of the camera 148 to discontinue attempting to capture images of the feature. Thus, when the feature recognition module 143 has recognized a feature to a sufficient confidence level, there may no longer be a need for human review of the feature, and the review support camera 148 may be controlled to stop capturing images of the feature.

The camera control module 141 may include computer-readable instructions that when executed by the processor(s) 110 cause the processor(s) to determine if a feature is currently in a camera exclusion location after the camera 148 has captured at least one image of the feature, and, responsive to the feature being in a camera exclusion location, control operation of the camera 148 to discontinue attempting to capture images of the feature.

A low recognition confidence level feature may be determined to be located in a "camera exclusion location" when the low recognition confidence level feature is no longer in a position with respect to the vehicle 100 such that the camera 148 may be controlled so as to include the feature in a field of view of the camera (i.e., the camera 148 can no longer be swiveled, raised, lowered, translated, or otherwise controlled so as to bring the feature into its field of view).

The camera control module 141 may include computer-readable instructions that when executed by the processor(s) 110 cause the processor(s) to, responsive to a feature being in a camera exclusion zone after the vehicle camera 148 has taken at least one photograph of the feature, control operation of the vehicle 100 to transmit feature information to an extra-vehicular entity for human review. In one or more arrangements, the extra-vehicular entity may be a human review facility 196 (FIG. 1). The human review facility 196 may include a human review manager 195 configured for allocating or assigning feature information received from various vehicles for human review by human reviewers HR1, HR2, HR3, etc. In particular arrangements, the feature information may be forwarded to the human review facility 196 in real time, as soon as attempted image capture by the camera 148 is discontinued. This enables rapid review of the feature information and classification of the low recognition confidence level feature.

In particular arrangements, the feature information may include point cloud data representing the low confidence level feature and one or more time-correlated images of the feature captured by the camera 148. The human review facility 196 may have hardware and software needed for processing point cloud data to generate two-dimensional or three-dimensional graphical representations of the feature represented by the point cloud, for comparison with one or more associated camera images by a human reviewer.

In one or more arrangements, after the low recognition confidence level feature has been classified by a human reviewer, the identification, the point cloud(s) associated with the feature, and other pertinent information may be forwarded to a server facility or other entity 197, where the new feature information may be incorporated into a feature identification system (not shown) configured to facilitate analysis and identification of point cloud information. The feature identification system may include reference known point clouds for comparison with lidar and radar scan data acquired by other vehicles 198, 199 that use the feature identification system as a source of known reference point clouds. The other vehicles 198, 199 may then have access to the new feature information, for comparison with point clouds generated from lidar and radar scans performed by these vehicles. The new feature information may be stored in the server facility 197 for remote access by the other vehicles 198, 199 as needed, or the new feature information may be disseminated to the vehicles 198, 199 for local use as needed.

Figure 2:
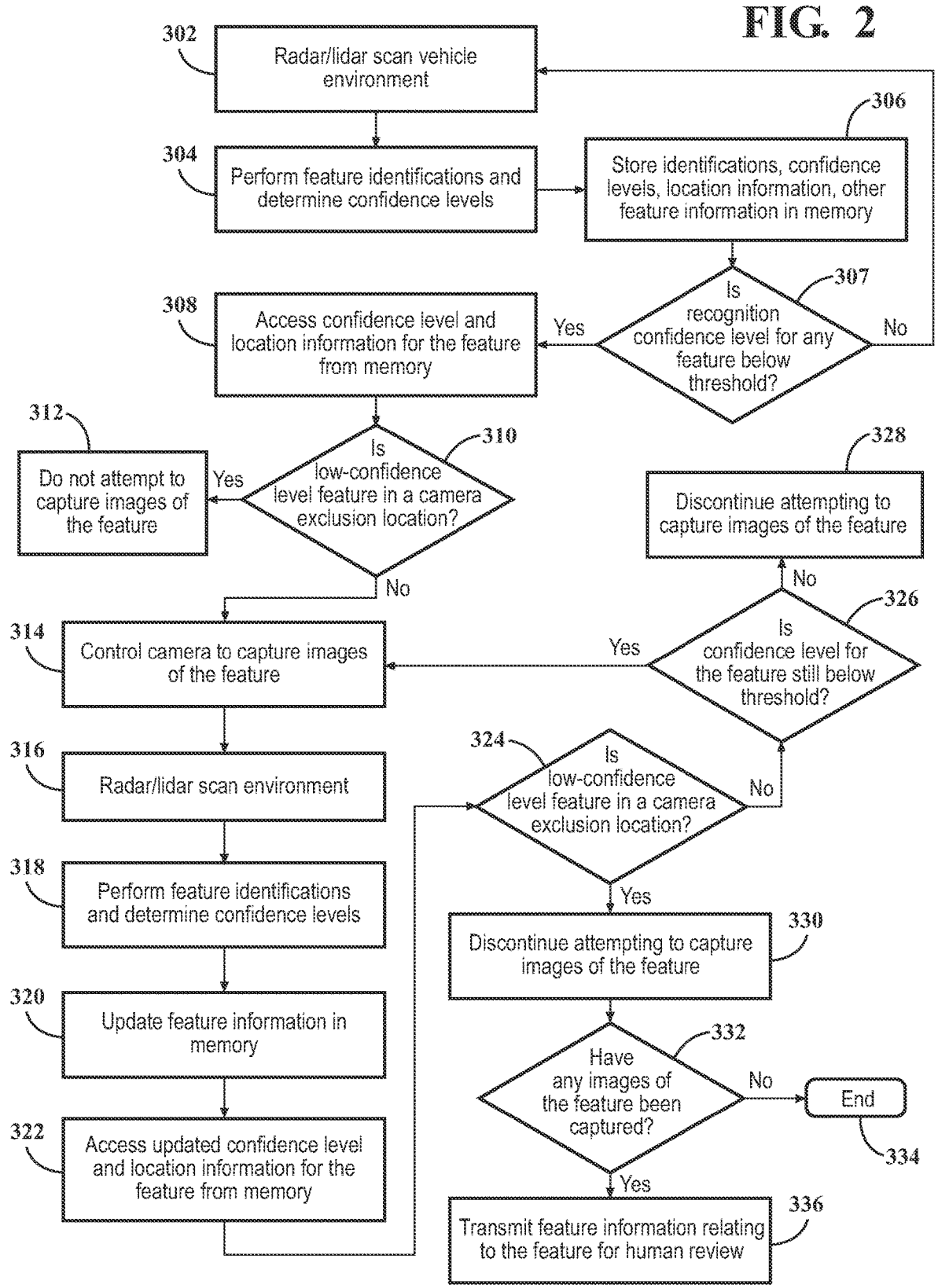
FIG. 2 is a flow diagram illustrating operation of a camera control system in accordance with an embodiment described herein.
Figure 3:
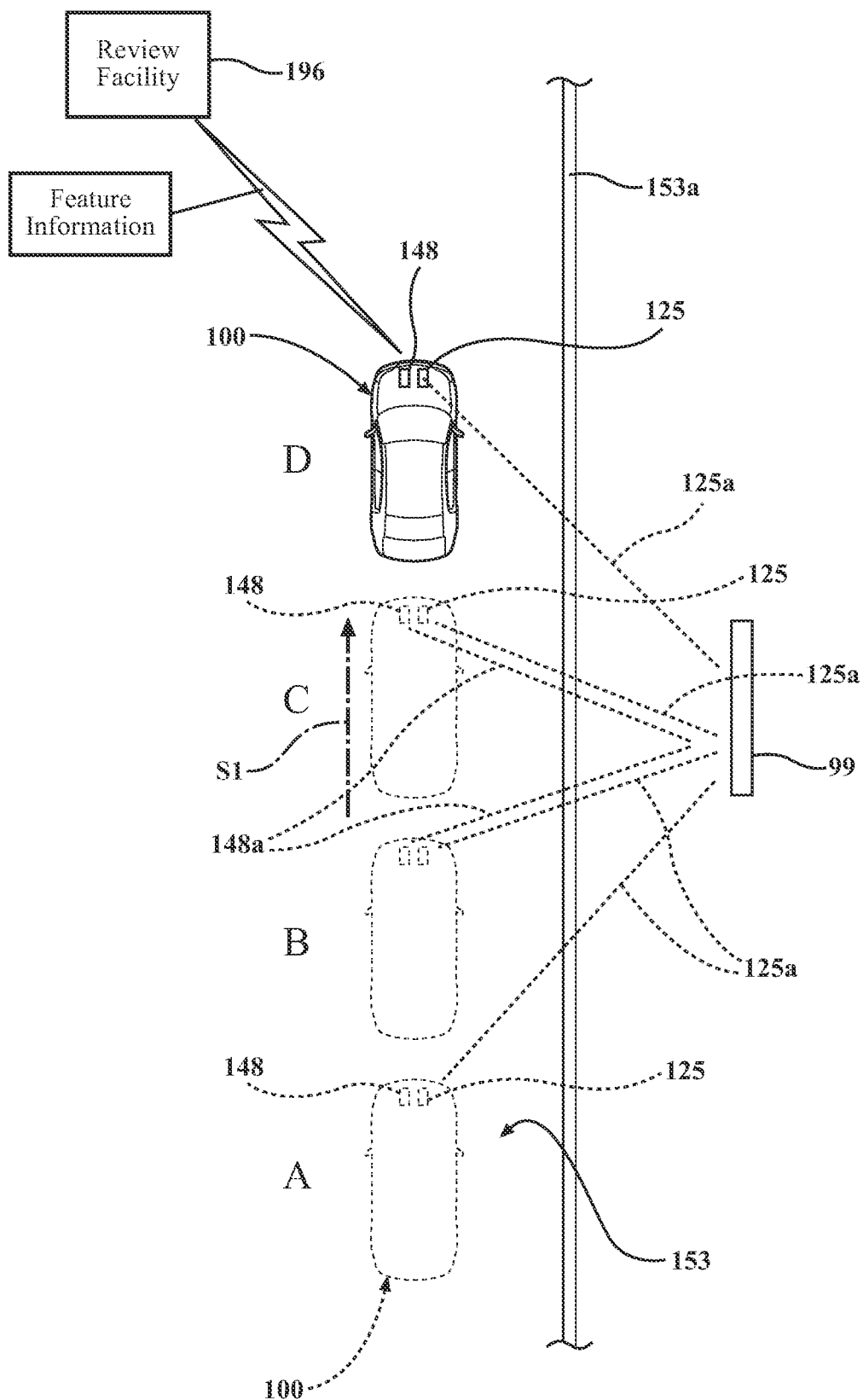
FIG. 3 is a schematic plan view of a vehicle moving along a road during operation of the camera control system in accordance with an embodiment described herein.

FIG. 2 is a flow diagram illustrating operation of a camera control system in accordance with an embodiment described herein. FIG. 3 is a schematic plan view of a vehicle 100 moving along a road 153 in direction Si during operation of the camera control system. FIG. 3 shows progress of the vehicle 100 as it moves along the road 153 (FIG. 3) from position "A" to position "D". Although operation of the review support camera control system will be described in terms of augmenting data acquired by a lidar sensor 125, it is understood that the following description may also apply to use with data acquired by a radar sensor or any other sensor which acquires point cloud data or other data which may be processed to identify or recognize features in the vehicle environment.

During movement along the road 153 (FIG. 3), the sensor control module 142 may control operation of the environment sensors 122 to survey the vehicle environment for purposes of possible threat detection, determining a position of the vehicle relative to features in the environment, and for other purposes. The vehicle environment may include various features detectable by a lidar scan, for example, traffic signs or lights, foliage, pedestrians, other vehicles, etc. Along the path of the vehicle 100 may be an unrecognized or low recognition confidence level feature 99 set back from an edge 153a of the road 153. The feature may be detected by a portion 125a of the lidar scan when the vehicle 100 is in position "A".

Referring to FIGS. 2 and 3, in position "A", the sensor control module 142 may (in block 302, FIG. 2) control operation of a lidar sensor 125 to scan the vehicle environment. Feature 99 may be detected by a portion 125a of the lidar scan. Lidar scans of the vehicle environment may be ongoing, at a predetermined scan rate.

Upon receiving data from the lidar scan, the feature recognition module 143 (or another module) may, in cooperation with the processor(s) 110, process the lidar data to generate one or more point clouds including representations of scanned features. The feature recognition module 143 may then (in block 304) execute routines directed to identifying detected features, including feature 99. The feature recognition module 143 may then calculate recognition confidence levels for the feature identifications, including a confidence level for the identification of feature 99. The feature recognition module 143 may then (in block 306) store feature information relating to all detected features (including feature 99) in memory (such as lidar scan information 118).

While the vehicle 100 is still in position "A" (or in a position of the moving vehicle intermediate position "A" and position "B"), the camera control module 141 may (in block 307) access the stored feature information in memory to determine if a recognition confidence level of any detected feature is below the predetermined threshold. In the example shown in FIG. 2, the feature 99 may have a confidence level below the threshold. If none of the stored confidence levels are below the predetermined threshold, control may pass back to block 302, where the lidar sensor 125 may continue to scan the vehicle environment. However, if any of the stored confidence levels are below the predetermined threshold, the camera control module 141 may (in block 308) access from memory location information describing the location of the low confidence level feature. Thus, in the example, the camera control module 141 may access location information describing the location of feature 99. The camera control module 141 may then (in block 310) determine if the low confidence level feature 99 resides in a camera exclusion location.

By this time, the vehicle 100 has moved to position "B" (FIG. 3). If the low confidence level feature 99 resides in a camera exclusion location, the camera 148 is unable to capture images of the feature. In this case, the camera control module 141 may (in block 312) not control camera 148 to attempt to capture images of the feature 99. However, if the low confidence level feature 99 does not reside in a camera exclusion location, the camera control module 141 may (in block 314) control operations of the review support camera 148 to start capturing images of the feature 99. A line of sight from the camera 148 to feature 99 is shown in FIG.

3 as 148a. After the camera 148 is focused on feature 99, the camera control module 141 may also (in block 314) time-correlate any captured image of feature 99 with a contemporaneous lidar scan occurring after the camera 148 starts capturing images. At the same time, the processes of lidar scanning (block 316) and feature identification/confidence level determination (block 318) are continuing while images of the feature 99 are being captured. Feature information relating to feature 99 is also being updated (block 320) in lidar scan information 118 as soon as a new scan is performed and new scan data is processed.

Responsive to each feature information update, the camera control module 141 may (in block 322) access the confidence level associated with feature 99. The camera control module may then (in block 324) determine if the low confidence level feature 99 currently resides in a camera exclusion location with respect to the vehicle 100. If the low confidence level feature 99 does not reside in a camera exclusion location, the camera control module 141 may (in block 326) compare the updated confidence level with the predetermined threshold, to determine if the updated confidence level is still below the threshold. The vehicle may now be in position "C" in FIG. 2. If the updated confidence level is still below the threshold, control may pass back to block 314, where the camera control module continues to control the camera 148 to capture images of the feature 99.

The camera control module 141 may continue as just described to control the camera 148 to capture images of the feature 99 as long as the confidence level associated with feature 99 remains below the threshold, and as long as feature 99 is within a field of view of the camera 148 (i.e., as long as the feature is not in a camera exclusion location).

Returning to block 326 (FIG. 2), if the updated confidence level is not still below the threshold, then the confidence level has risen to a level where the feature 99 may be considered "recognized" or "identified". Control may then pass to block 328, where the camera control module 141 may control the camera 148 to discontinue attempting to capture images of the feature 99.

Returning to block 324, if the low confidence level feature 99 resides in a camera exclusion location, the camera 148 is no longer able to capture images of the feature. In this case, the camera control module 141 may (in block 330) control the camera 148 to discontinue attempting to capture images of the feature 99. FIG. 2 shows vehicle 100 in a position "D", in which the feature 99 is in an exclusion location from which the camera 148 can no longer be focused on the feature 99. However, the lidar sensor 125 may still detect the feature 99 (as well as other vehicle environment features) from position "D".

In addition, at block 330, because the confidence level associated with the feature 99 has never reached a level at or above the threshold during image capture and updating of the feature information, the feature 99 remained classified as "unidentified". Thus, following block 330, the camera control module 141 may (in block 332) perform a final check to determine if any images of the feature 99 have been captured up to that point. If no images have been captured, there will be no camera images to forward to a human reviewer, and the image capture routine may end at block 334. However, if images of the low confidence level feature 99 have been captured, the camera control module 141 may (in block 336) control operation of the vehicle 100 to transmit feature information relating to the feature 99 for human review.

In the embodiments described herein, the human reviewer may compare and relate (in real time) the lidar/radar information to associated camera images of the actual feature represented in the lidar/radar information. The provision of camera images of a feature whose identification is being reviewed by a human may enable more rapid and accurate identification of the feature and, consequently, more accurate correlations between point clouds and the physical objects they represent. In addition, when the lidar/radar information is categorized or associated with an actual known feature, the newly-acquired lidar/radar information relating to the feature may be added to a catalog of known lidar/radar information associated with the feature, thereby expanding the resource database used by a computing system for comparison with newly-acquired lidar/radar information. This may facilitate future recognition of that feature or a similar feature in other vehicles using the same database as a source of known lidar/radar information for comparison.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4B, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of ... and ...." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A camera control system for controlling operation of a camera mounted on a vehicle, the system comprising:
   a processor; and
   a memory communicably coupled to the processor and storing a camera control module including computer-readable instructions that when executed by the processor cause the processor to:
   compare a recognition confidence level associated with a feature in an environment of the vehicle to a predetermined threshold; and
   responsive to the recognition confidence level being below the predetermined threshold and using location information associated with the feature, control operation of the camera to capture at least one image of the feature during movement of the vehicle.

2. The camera control system of claim 1 wherein the camera control module includes computer-readable instructions that when executed by the processor cause the processor to, responsive to the recognition confidence level being at or above the predetermined threshold, control operation of the camera to discontinue attempting to capture images of the feature.

3. The camera control system of claim 1 wherein the camera control module includes computer-readable instructions that when executed by the processor cause the processor to:
   determine if the feature is currently in a camera exclusion location after the camera has captured at least one image of the feature; and
   responsive to the feature being in a camera exclusion location, control operation of the camera to discontinue attempting to capture images of the feature.

4. The camera control system of claim 3 wherein the camera control module includes computer-readable instructions that when executed by the processor cause the processor to, responsive to the feature being in a camera exclusion location after the camera has captured at least one image of the feature, control operation of the vehicle to transmit feature information relating to the feature to an extra-vehicular entity for human review.

5. The camera control system of claim 4 wherein the feature information includes point cloud data representing the feature and one or more images of the feature captured by the camera and time-correlated with the point cloud data.

6. The camera control system of claim 1 wherein the vehicle includes a lidar sensor operable to attempt to detect the feature in the vehicle environment, and wherein the camera control module includes computer-readable instructions that when executed by the processor cause the processor to control operation of the camera to capture one or more images of the feature simultaneously with operation of the lidar sensor.

7. The camera control system of claim 6 wherein the camera control module includes computer-readable instructions that when executed by the processor cause the processor to time-correlate lidar data with at least one contemporaneous image of the feature captured by the camera.

8. The camera control system of claim 1 wherein the vehicle includes a radar sensor operable to attempt to detect the feature in the vehicle environment, and wherein the camera control module includes computer-readable instructions that when executed by the processor cause the processor to control operation of the camera to capture images of the feature simultaneously with operation of the radar sensor.

9. The camera control system of claim 8 wherein the camera control module includes computer-readable instructions that when executed by the processor cause the processor to time-correlate radar data with at least one contemporaneous image of the feature captured by the camera.

10. A computer-implemented method for controlling operation of a camera mounted on a vehicle, the method comprising steps of:
- comparing a recognition confidence level associated with a feature to a predetermined threshold; and
- responsive to the recognition confidence level being below the predetermined threshold and using location information associated with the feature, controlling operation of the camera to capture at least one image of the feature during movement of the vehicle.

11. The method of claim 10 further comprising the step of, responsive to the recognition confidence level being at or above the predetermined threshold, controlling operation of the camera to discontinue attempting to capture images of the feature.

12. The method of claim 10 further comprising the steps of:
- determining if the feature is currently in a camera exclusion location after the camera has captured at least one image of the feature; and
- responsive to the feature being in a camera exclusion location, controlling operation of the camera to discontinue attempting to capture images of the feature.

13. The method of claim 12 further comprising the step of, responsive to the feature being in a camera exclusion location after the camera has captured at least one image of the feature, controlling operation of the vehicle to transmit feature information relating to the feature to an extra-vehicular entity for human review.

14. The method of claim 13 wherein the feature information includes point cloud data representing the feature and one or more images of the feature captured by the camera and time-correlated with the point cloud data.

15. The method of claim 10 wherein the vehicle includes a lidar sensor operable to attempt to detect the feature in the vehicle environment, and further comprising the step of controlling operation of the camera to capture one or more images of the feature simultaneously with operation of the lidar sensor.

16. The method of claim 15 further comprising the step of time-correlating lidar data with at least one contemporaneous image of the feature captured by the camera.

17. The method of claim 10 wherein the vehicle includes a radar sensor operable to attempt to detect the feature in the vehicle environment, and further comprising the step of capturing images of the feature simultaneously with operation of the radar sensor.

18. The method of claim 17 further comprising the step of time-correlating radar data with at least one contemporaneous image of the feature captured by the camera.

19. A non-transitory computer readable medium for controlling operation of a camera mounted on a vehicle, the medium having stored therein instructions that, when executed by a computing system, cause the computing system to perform functions comprising:
- comparing a recognition confidence level associated with a feature to a predetermined threshold; and
- responsive to the recognition confidence level being below the predetermined threshold and using location information associated with the feature, controlling operation of the camera to capture at least one image of the feature during movement of the vehicle.

20. The non-transitory computer readable medium of claim 19 further comprising the steps of:
- determining if the feature is currently in a camera exclusion location after the camera has captured at least one image of the feature; and
- responsive to the feature being in a camera exclusion location, controlling operation of the camera to discontinue attempting to capture images of the feature.

* * * * *